(12) United States Patent
Maffeis

(10) Patent No.: US 8,528,953 B2
(45) Date of Patent: Sep. 10, 2013

(54) DEVICE FOR OPERATING A GRIPPING OR MOVEMENT TOOL STARTING FROM AN ELECTRIC ACTUATOR

(75) Inventor: Giuseppe Maffeis, Roncadelle (IT)

(73) Assignee: GIMATIC S.p.A., Roncadelle (Brescia) (IT)

( * ) Notice: Subject to any disclaimer, the term of this patent is extended or adjusted under 35 U.S.C. 154(b) by 199 days.

(21) Appl. No.: 13/082,083

(22) Filed: Apr. 7, 2011

(65) Prior Publication Data

US 2011/0247438 A1 Oct. 13, 2011

(30) Foreign Application Priority Data

Apr. 12, 2010 (IT) .............................. BS 2010 A 0074

(51) Int. Cl.
*B25J 15/00* (2006.01)
(52) U.S. Cl.
USPC ........................................ 294/207; 294/119.1
(58) Field of Classification Search
USPC ................. 294/119.1, 207, 116, 203; 901/38
See application file for complete search history.

(56) References Cited

U.S. PATENT DOCUMENTS

| | | | | |
|---|---|---|---|---|
| 4,593,948 A * | 6/1986 | Borcea et al. | ................. | 294/202 |
| 5,967,581 A * | 10/1999 | Bertini | ........................... | 294/207 |
| 6,161,888 A * | 12/2000 | Black et al. | ................... | 294/116 |
| 6,471,200 B2 * | 10/2002 | Maffeis | ........................... | 269/34 |
| 7,172,230 B2 * | 2/2007 | Maffeis | ........................ | 294/203 |
| 8,033,025 B2 * | 10/2011 | Maffeis | ........................... | 30/228 |
| 2003/0189349 A1 * | 10/2003 | Risle et al. | ....................... | 294/88 |
| 2009/0127879 A1 * | 5/2009 | Maffeis | ........................... | 294/88 |
| 2009/0278369 A1 * | 11/2009 | Maffeis | ........................... | 294/88 |
| 2010/0052348 A1 * | 3/2010 | Williams et al. | ........... | 294/119.1 |

* cited by examiner

*Primary Examiner* — Saul Rodriguez
*Assistant Examiner* — Gabriela Puig
(74) *Attorney, Agent, or Firm* — McGlew and Tuttle, P.C.

(57) ABSTRACT

A device for operating gripping or movement tools provided at least with a movable member (16, 17) movable alternatively between a first and a second position distanced between them by a cursor (18) susceptible to controlled alternative linear movements starting from an electric actuator. The device includes a transmission element (27) of the movement connected to the actuator, one towing slide (26) associated with the cursor (18) and susceptible to alternative movements caused by the actuator by the transmission element, and at least an elastic member (28) positioned preloaded between the towing slide (26) and the cursor (18) parallel both to their movement direction and to the movement direction of at least a mobile member. The cursor and the towing slide can both move rigidly together as long as the preload of the elastic element remains unchanged, both independently one with the other in reply to the variation of the preload of the elastic element deriving from a resistance against the movement of at least the mobile member.

9 Claims, 4 Drawing Sheets

DEVICE FOR OPERATING A GRIPPING OR MOVEMENT TOOL STARTING FROM AN ELECTRIC ACTUATOR

FIELD OF THE INVENTION

The present invention relates to a device for operating gripping or movement tools, such as a gripper, a slide and the like, by means of an actuator, such as an electric control motor.

STATE OF THE TECHNIQUE

In the tools field for gripping items, objects or various bodies during their production and/or manipulation and/or assembly steps, well known are the grippers with two functional members in the form of gripping means provided with jaws and movable in opposite directions between two extreme positions, respectively active and inactive, that is to say closed and open. Movement systems are also well known as they have a member, for example of the slide type, provided with alternative forward and backward movements.

In particular, said tools or gripper or movement systems can be of the pneumatic control or of the electric control type. In the case of pneumatic control grippers, the jaws are properly connected to and operated alternatively by a piston which is movable in a relative chamber by means of a fluid under pressure. The electric control grippers on the other hand comprise, as an actuator, an electric or a solenoid motor that moves the gripper jaws between the active and inactive positions by means of a translating member.

Nevertheless, keeping to the well known realizations, the electric control grippers have an actuator and a kinematic transmission able to transmit a set stroke both towards the inactive position and towards the active position to the gripper jaws. The drawback that derives from it is not to be able to adapt to at least the active stroke and the gripper force in relation to the difference in the nominal dimensions of the items or objects that the tool is designed to grip. It may however happen that said items or objects have for various reasons, at least because of the tolerance of processing, different dimensions one from the other, in which case the smallest can be gripped with insufficient force and the largest with excessive force. The result is that in a case an item or object does not get correctly gripped and in the other case induces unwanted solicitations in the actuator and in the kinematic transmission of the motion.

In order to avoid the inconvenience, at present mechanical or electronic management is applied to the electric actuator, that is to say of the control motor group of the gripper, by means of a sophisticated, complex and expensive programming and control system so as to be able to finely set up the operation depending on the trend of the or those controlled mobile members. In other words, the strokes of the gripper jaws depend directly on the rotation of the motor and if this is not chosen, adjusted and controlled with precision, the correct gripping action of the to of becomes incorrect. Furthermore to maintain the gripper in an active position, that is gripping an item or the like, the motor must remain continuously active with a relative absorption of energy.

On the other hand should the feed current lack the gripper can be deactivated, releasing the item.

Similar problems can be verified also in slide movement systems with a single member movable between two extreme positions defined by the stop.

OBJECTIVE AND SUMMARY OF THE INVENTION

An objective of the present invention is to improve the conditions and the precision of impulse of a gripper tool or electric control movement devices of the type mentioned above and to effectively resolve the above complained about problems regarding the known technique, simplifying furthermore the kinematic transmission of the motion by the electric actuator to the moveable member or members between two extreme positions and ensuring, where required, an item and objects gripping with an appropriate force also when they have different nominal dimensions.

This objective is reached with a device for operating a gripping or of movement system that comprises a body, at least a mobile member associated with said body and moveable alternately between a first position and a second position at a distance between each to other, a slide susceptible to alternative linear movements in said body and connected to said at least a mobile member for the movements of the latter from one to the other of said positions, and an actuator, preferably electric, designed to control the alternating movements of said cursor and through the latter said at least a mobile device.

According to the invention said device basically comprises a means of transmission of the movement actuated by the actuator, a towing slide associated with said cursor and subject to alternative movements caused by said actuator through said transmission means, and at least an elastic means positioned preloaded between said towing slide and said cursor in parallel both to their movement direction and to the movement direction of at least a mobile member, so that cursor and towing slide can move both together as one as long as the preload of the elastic means remains unchanged, and independently one from the other in answer to the variation of the preload of the elastic means deriving from a resistance against the movement of said movable member.

The device to be operated can be a slide provided with a single alternative movable member between two limit stop.

Otherwise, the device to be operated can be made up of a gripper provided with, as mobile members, two gripping jaws moveable in opposite directions to grip or release from time to time an item or object.

Basically, the towing slide driven by the actuator by means of the transmission is always subject to a set stroke, whereas the cursor can move in line also relatively to the towing slide and carry out variable strokes within certain limits depending on the resistance to the movement that the mobile member or members can meet.

By this, the device according to the invention has at least the advantages:

of eliminating the necessity of having to resort to a sophisticated electronic and mechanical management of the electric actuator;

of removing the electric actuator from the function of carrying out and maintaining exactly the member or members controlled in each of the two extreme positions that they can assume;

of exercising at least in one movement direction of each mobile member a positive force supplied by the elastic means and not a lot by the actuator;

of providing the controller device of the elastic stroke compensator that consents to control, at least in the case of the gripper, an appropriate gripping force on the part of the jaws even on items with different dimensions;

of being able to adjust, by means of a choice of the preload of the elastic means, the force exercised on a level with the or each of the controlled mobile members in at least one direction;

of allowing the rotation of the electric actuator and with it the transmission means always in the same direction.

BRIEF DESCRIPTION OF THE DRAWINGS

Further details of the invention will become evident from the continuation of the description carried out in reference to the enclosed drawings and explanatory of an example of an application oft he impulse device to a gripping means in the form of a linear gripper with two opposed members movable in the opposite directions, remaining however understood that a similar application device may be suitable and used also in connection with tools to control as they have a single alternating movable member motion, such as slides and the like. Therefore, in said drawings.

DETAILED DESCRIPTION OF THE INVENTION

Figure 1:
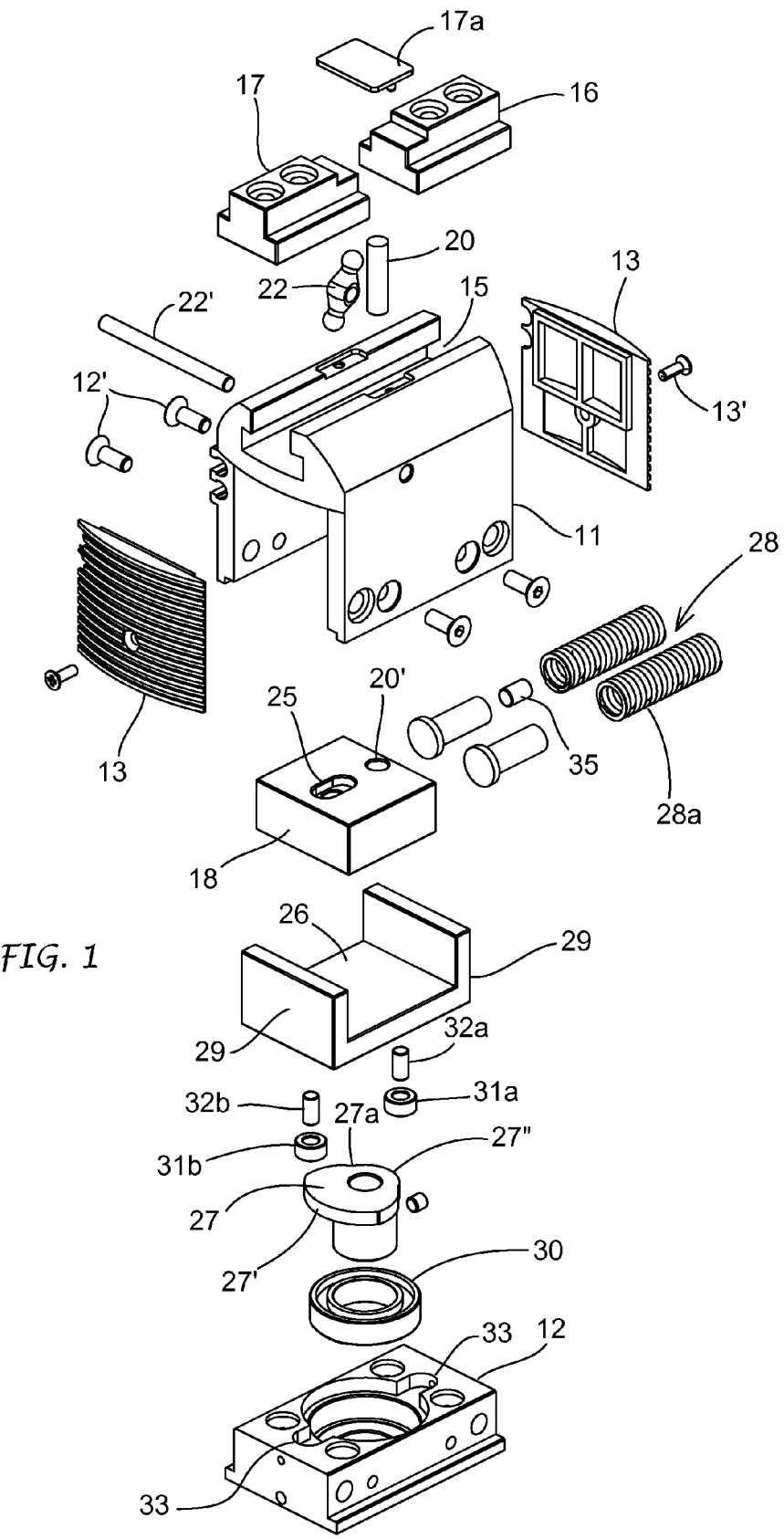
FIG. 1 shows an exploded view of the components of a linear gripper incorporating the device of the invention.
Figure 2:
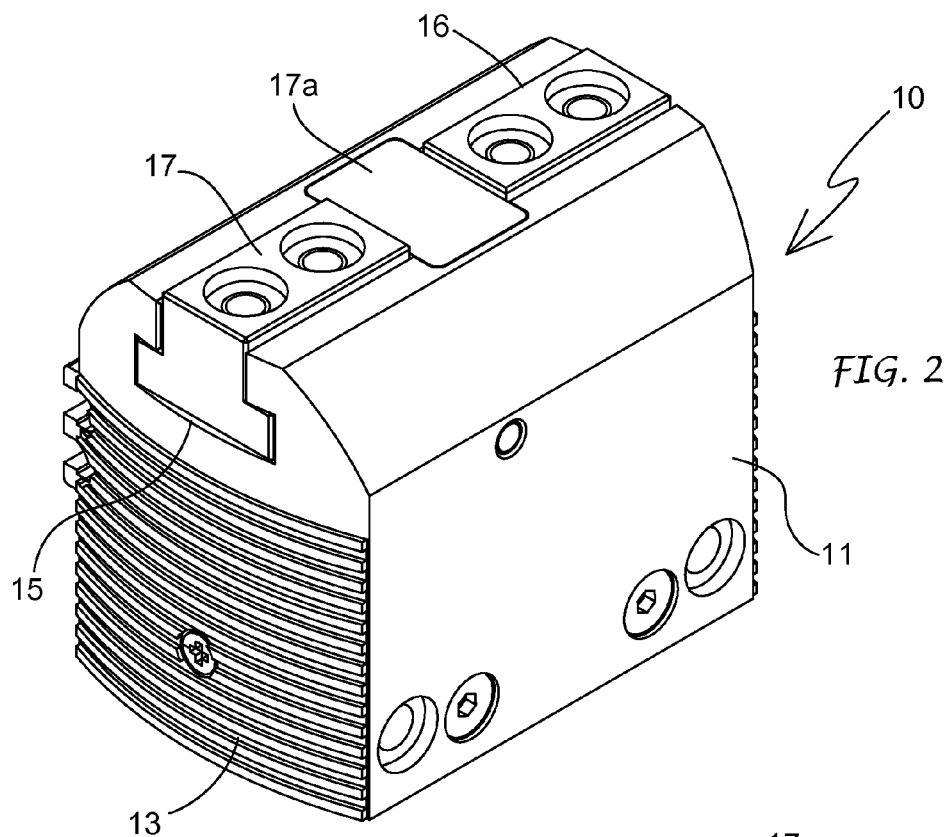
FIG. 2 shows a perspective view of the assembled gripper with relative approached jaws.
Figure 5:
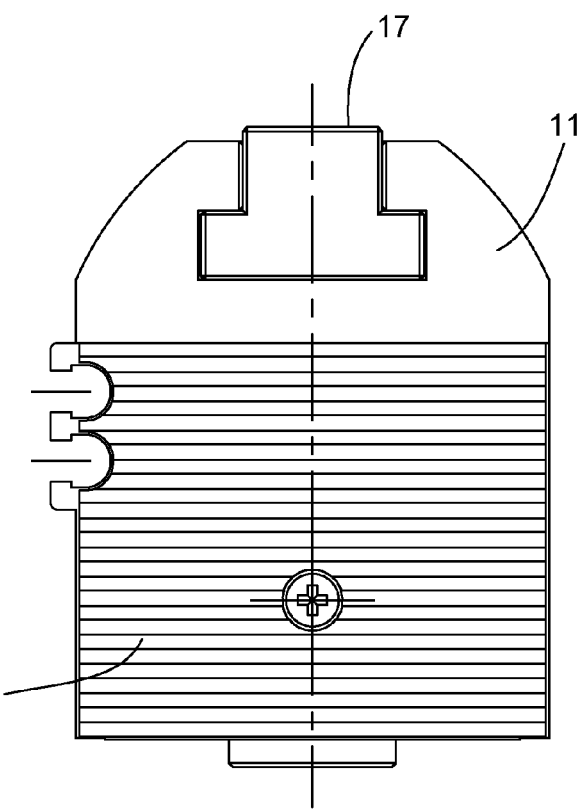
FIGS. 4 and 5 show two views, respectively, from the top and side of the assembled gripper.
Figure 3:
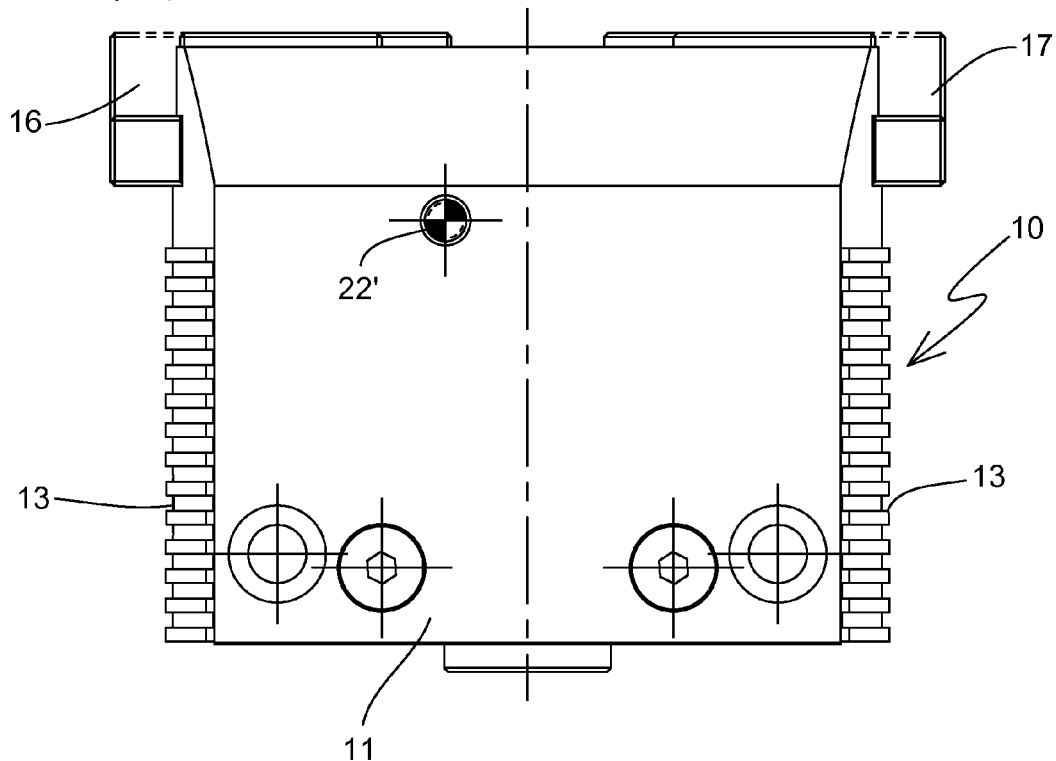
FIG. 3 shows a front view of the gripper in FIG. 1 and by dotted lines and the relative jaws at a distance one from the other.
Figure 4:
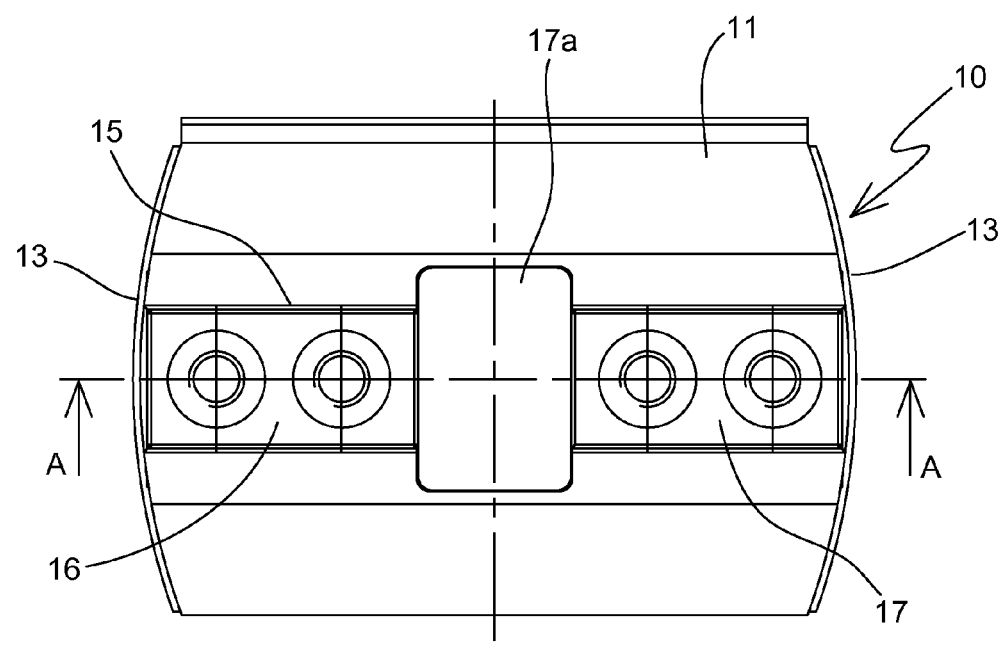

In the drawings is indicatively represented a gripper that basically comprises a gripper body 10 made up of a profile element 11 basically in an upside-down form U, to which a base plate 12 and two heads 13 at its opposite ends are fixed by screws 12' respectively 13' so as to delimit a chamber 14. On one of its sides, the one opposite the base plate 12, the body of the gripper 10 is provided with a guide groove 15 in which two mobile members in the shape of gripping jaws 16, 17 are guided and susceptible to movements in opposite directions, alternatively between a position in which they are approached and a position in which they are spread apart one from the other.

In particular, the guide groove 15 can have a an upside-down shape T, and the gripping jaws 16, 17 will be configured correspondingly to slide in said guide and result with the it top side facing the longitudinal opening of said guide groove 15.

The gripping jaws 16, 17 can be fixed from time to time to fasteners—not shown—configured depending on the shapes of the items or objects to grip. For example, the gripper can be equipped so as to be active, that is to say so that it can grip an item or an object with said fasteners, when the two gripping jaws are approached between them and inactive when the jaws are moved away from each other, or on the contrary to be inactive when the jaws are approached and active when they are separated.

On the top side of the gripper body 10 a protection plate 17a is attached, located above and facing in a transversal direction to an intermediate part of the guide groove 15. At their facing ends, the jaws gripping 16, 17 each have a portion that extends and always remains protected under the said protection plate 17a —FIG. 6—so as to prevent the penetration of dirt and extraneous elements between the jaws during alternating movements from one of their positions to another.

For their movements, the two gripping jaws 16, 17 are connected to a cursor 18 which is placed in the chamber 14 delimited by the gripper body 10 and is susceptible to alternative linear movements controlled by an electric actuator 19, preferably an electric motor, as will be described further on.

The connection of the gripping jaws 16, 17 to the cursor 18 can be carried out in any appropriate way, as long as they move at the same time in opposite directions in reply to the movements of said cursor.

For example and how it is represented, a first gripping jaw 16 can be rigidly connected radically to the cursor 18 to follow by mutual consent the movements, by means of a pin 20 that is inserted in a hole 20' and that passes and moves in a slot 21 made in the gripper body 10 between the chamber 14 and the guide groove 15. The second gripping jaw 17 can be connected to the cursor 18 by means of an oscillating transmission lever 22 so that the movement of said cursor in one direction corresponds to a movement of the second gripping jaw 17 in the opposite direction and however in an opposite direction to that of the first moveable gripping jaw 16, and vice versa in the opposite direction. The transmission lever 22 oscillates on an intermediate fulcrum 22' inserted transversely in the gripper body 10 and extends between the cursor 18 and the second jaw 17 crosses a hole 23 also made in the gripper body between the chamber 14 and the guide groove 15.

Furthermore, the ends of the oscillating lever 22 each presents a rolling surface, preferably cylindrical or spherical, and engage in corresponding seats 25, 25' respectively obtained in a lower part of the second jaw 17 and respectively in a higher part of the cursor 18.

The cursor 18 on the other hand, is associated with a towing slide 26 that is housed in the chamber 14 of the gripper body 10 and is susceptible to alternative movements controlled by the electric actuator 19 by means of a transmission of the motion which preferably is made up of a rotating cam 27 as shown in the drawings. The towing slide 26 is guided in said chamber 14 in parallel to its movement direction and that of the cursor 18 and interacts with the rotating cam 27 through of mechanical contact means. Obviously, to allow the movements, the towing slide 26 has a shorter length than that of the chamber 14 in which it is guided.

More precisely, the cursor 18 and the towing slide 26 are not rigidly paired, but with the interposition of at least an elastic member 28 positioned and working on the movement directrix of these two associated components 18, 26.

Figure 6:
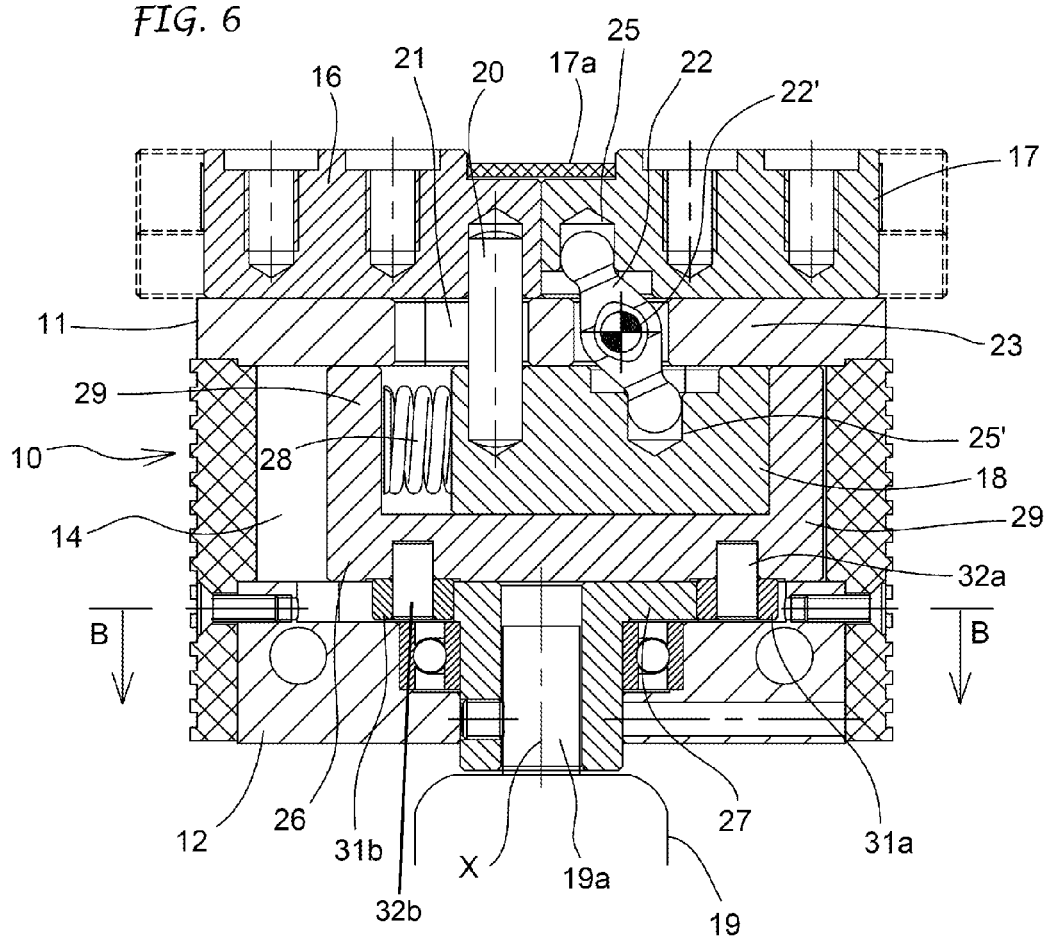
FIG. 6 shows an enlarged section of the gripper according to arrows A-A in FIG. 4.

The towing slide 26 has two shoulders 29 in the movement direction at a given distance one from the other; the cursor 18 has a shorter length than the distance between said shoulders 29 and is positioned movably between the latter; and at least an elastic member 28, is interposed with a preload and compressible between one shoulder 29 of the towing slide 26 and an end of the cursor 18 as shown in FIG. 6.

In the example illustrated, the elastic member 28 is made up of one or more helical springs 28a, parallel or coaxial, and is positioned at only one end of the cursor 18. However it could also be of another type and furthermore an elastic means could be positioned at each of the ends of the cursor 18, between the latter and each shoulder 29 of the towing slide 26.

The rotating cam 27 is positioned adjacent to the base plate 12 of the gripper body, therein supported by a bearing 30 and turning on an X axis, it being connected to the output shaft 19a of the electric actuator 19. Peripherally, the cam 27 has a profile defined by a first portion of the cam 27' which is roughly semicircular, with the function of a dead angle, having a first R radius, and by a second cam portion 27" diametraly opposite, having a second r minor radius of the radius of said first portion.

The two cam portions connect one to the other through intermediate planes 27a and the difference in measure between their R and r radius corresponds to the maximum length of the strokes of the gripping jaws between their extreme positions.

Figure 7:
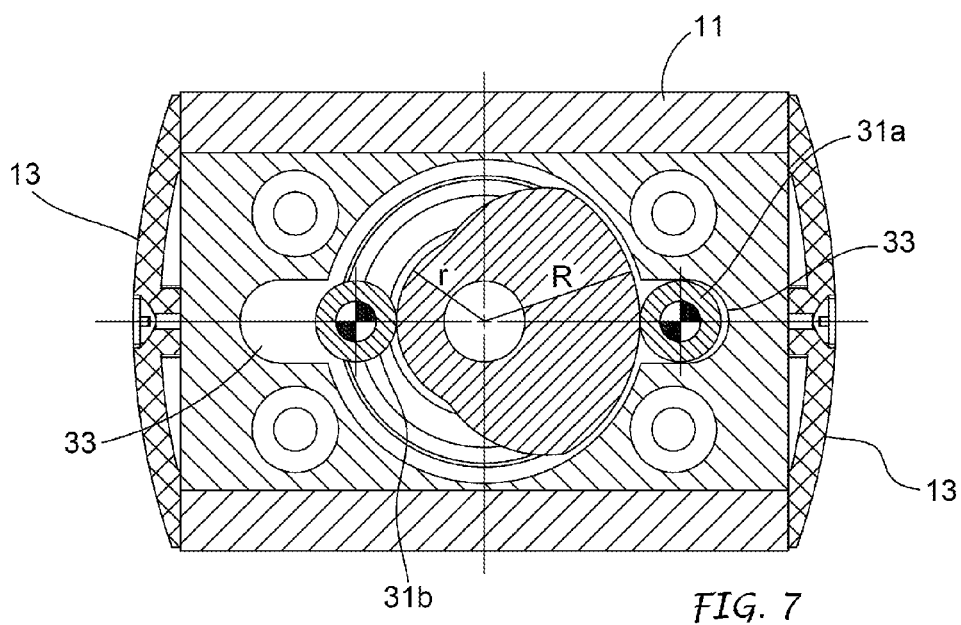
FIG. 7 shows a section of the gripper according to the arrows B-B in FIG. 6, also enlarged.

The mechanical contact means between the towing slide 26 and the transmission cam 27 are set up by two contact rollers 31a, 31b, attached to said slide 26 by means of respective pins 32a, 32b and resting against the profile of said cam, on opposite parts to this one. As shown in FIG. 7, the contact rollers 31a, 31b can be placed in line with corresponding recesses 33 provided in the base plate 12 of the gripper body 10 and translated in said recesses by following the movements of the towing slide 26 consequent to the rotation of said cam.

On the whole, however, both the presence of a single elastic means and the presence of two elastic means on opposite parts, cursor 18 and towing slide 26 can move both together as a rigid whole until the load of the elastic means 28/28a remain unchanged, both independently one from the other due to a compression and successive expansion which the elastic means can become subject to.

With the gripper in a rest position, the action of the or each elastic means 28/28a is directed to maintain the cursor 18 in a certain static position relatively on the towing slide 26 or better still, agreed that the latter, tends to move the gripping jaws 16, 17 normally in the direction of the grip of the item by means of the jaws they are equipped with.

When the electric actuator is active, it causes the rotation of the transmission cam 27 the profile of which, by interacting with the contact rollers 31a, 31b, determines the translation of the towing slide 26 and with it the cursor for an operation of the jaws 16, 17 by nearing or distancing it alternately. So, assuming that the gripper is preset, as for example is shown in the drawings, to grip an item or object when the jaws are approached, when the first portion of the profile 27'—with greater radius R—of the transmission cam 27 it finds itself having to engage with the contact roller 31a—the one on the right in FIG. 7—the slide 26 and the cursor 18 are moved in the approach direction of the jaws. On the contrary, when the first portion 27' of said cam has to engage with the other contact roller 31b—the one on the left in FIG. 7—the slide and the cursor are moved in the opposite direction and the jaws are spread open.

It is therefore sufficient for the first portion 27' of the profile of the cam 27 to be rotated towards and engage with one or the other contact roller 31a, 31b to provoke the closing and opening movements, that is to say the active and inactive strokes of the jaws. Until any loss of resistance contrary to their movement and to the movement of the jaws, the towing slide 26 and the cursor 18 move solidly together thanks the elastic means 28/28a interposed between them.

Given its angular extension or dead angle, which as said beforehand is semicircular, it is sufficient should any part of said portion of the cam 27' engage with one of the contact rollers 31a, 31b to determine a stroke of the gripping jaws in one direction or in the other even if the rotation of the electric actuator is not exactly equal to the stroke of the slides. Then, as soon as the jaws meet the item or object to grip and therefore find a resistance to their movement, enter into action the elastic means which on one hand allow a relative movement of the cursor compared to the slide and on the other hand they define the gripper force of the item notwithstanding the force of the actuator.

The same happens when the driven member is single, such as the sliding element provided with an alternative motion of a slide, and said member reaches the means that delimit the strokes.

Note that the devices described above can undergo modifications without however departing from the aim of the invention. So, instead of a cam, as a transmission system for the control of the towing slide and, by means of this, of the cursor and device or devices to control a connecting-rod assembly or the like can be adopted. Furthermore, on one side of the body 10, in necessary grooves, sensors, for example of the magnetic type, can be applied, which are suitable for detecting the positions of the cursor and correspondingly the active and inactive positions of the controlled fixture, through at least a magnetic device 35—FIG. 1—directly or indirectly associated with the cursor itself.

The invention claimed is:

1. A device for operating gripping or movement tools, the device comprising:
   a body;
   at least a movable member associated with said body and movable reciprocating between a first and a second spaced positions;
   a cursor capable of reciprocating linear movements in said body and connected to at least said movable member for the movements of said at least said movable member from one of said first and second spaced positions to another of said first and second spaced positions;
   an electric actuator designed to control the reciprocating movements of said cursor and said at least said movable member;
   a means for transmission of the movement driven by the actuator;
   a towing slide associated with said cursor and capable of reciprocating movements in said body caused by the actuator through the transmission means; and
   at least an elastic member positioned and preloaded between said towing slide and said cursor, said at least said elastic member being parallel to a movement direction of said towing slide and said cursor and parallel to a movement direction of at least said movable member such that the cursor and towing slide can move together as one as long as the preload of the elastic member remains unchanged and such that said cursor and towing slide are independent from one another other in response to a variation of a preload of said at least elastic member deriving from a resistance against the movement of said at least movable member.

2. A device according to claim 1, wherein the towing slide has two shoulders the movement direction of which is at a given distance one from the other, the cursor has a shorter length than the distance between said shoulders and said cursor is placed and moves between said shoulders, and said at least elastic member is positioned with a preload and is compressible between one of said shoulders of said towing slide and one end of the cursor, said at least elastic member being positioned and operating in the direction of the movement of said associated slide and cursor.

3. A device according to claim 1, wherein the towing slide has two shoulders in the movement direction at a given distance one from the other, the cursor has a shorter length than the distance between said shoulders and said cursor is positioned and moves between said shoulders, and each said elastic member is interposed with a preload and between each of said shoulders of said towing slide and at each end of the cursor such that said each said elastic member is compressible, each said elastic member operating in the direction of the movement of said associated slide and cursor.

4. A device according to claim 1, wherein said at least elastic member comprises one or more springs.

5. A device according to claim 1, wherein the electric actuator is a motor and the means for transmission of the movement is formed by a connecting-rod assembly connected on one side to an output shaft of said motor and on another side to the tow slide.

6. A device according to claim 1, wherein the electric actuator is a motor and the means for transmission of the movement comprises a rotating cam connected to an output shaft of said motor and associated with the towing slide by a mechanical means formed by contact rollers.

7. A device according to claim 6, wherein said rotating cam is supported by a bearing and said rotating cam has a profile defined by a first almost semicircular portion, with a dead angle function, having a first radius, and by a second cam portion diametrically opposite said first almost semicircular portion, said second cam portion having a second minor radius of said first almost semicircular portion, with said first portion and said second cam portion of the cam being linked by means of intermediate planes, wherein a difference in size between said first radius and said second minor radius corresponds to a maximum length of strokes of jaws between extreme positions of said jaws.

8. A device according to claim 1, wherein the device controls a tool having a single member movable by a reciprocating motion between two limit switch ends.

9. A device according to the claim 1, wherein the device controls a tool having two mobile members in the form of gripper jaws moveable in opposite directions to pick up or release an item or object as required.

* * * * *